United States Patent
Chen et al.

(10) Patent No.: US 7,630,870 B2
(45) Date of Patent: Dec. 8, 2009

(54) METHOD AND SYSTEM FOR EFFICIENT DESIGN VERIFICATION OF A MOTION ADAPTIVE DEINTERLACER

(75) Inventors: Jiann-Tsuen Chen, Saratoga, CA (US); Jean-Huang Chen, Cupertino, CA (US)

(73) Assignee: Broadcom Corporation, Irvine, CA (US)

(*) Notice: Subject to any disclaimer, the term of this patent is extended or adjusted under 35 U.S.C. 154(b) by 613 days.

(21) Appl. No.: 11/005,092

(22) Filed: Dec. 6, 2004

(65) Prior Publication Data

US 2006/0069542 A1    Mar. 30, 2006

Related U.S. Application Data

(60) Provisional application No. 60/613,660, filed on Sep. 28, 2004.

(51) Int. Cl.
*G06F 7/48* (2006.01)
(52) U.S. Cl. .............................. 703/6; 716/5; 348/441; 348/448; 714/741
(58) Field of Classification Search ...................... 716/5; 703/6, 22, 2; 348/441, 448, 451, 452, 581, 348/628; 714/1, 25, 26, 30, 31, 724, 738, 714/741
See application file for complete search history.

(56) References Cited

U.S. PATENT DOCUMENTS

| | | | |
|---|---|---|---|
| 5,844,617 A * | 12/1998 | Faroudja et al. | 348/441 |
| 5,940,141 A * | 8/1999 | Faroudja et al. | 348/628 |
| 2004/0066466 A1 * | 4/2004 | MacInnis et al. | 348/451 |
| 2005/0168634 A1 * | 8/2005 | Wyman et al. | 348/448 |
| 2006/0095878 A1 * | 5/2006 | Chen et al. | 716/5 |

OTHER PUBLICATIONS

Markandey et al., V. Motion Adaptive Deinterlacer for DMD (Digital Micromirror Device) Based Digital Television, IEEE Transactions on Consumer Electronics, vol. 40, Iss. 3, Aug. 1994, pp. 735-742.*
Jung et al., Y.-Y. An Effective De-Interlacing Technique Using Motion Compensated Interpolation, IEEE Transactions on Consumer Electronics, vol. 46, No. 3, Aug. 2000, pp. 460-466.*
Markandey et al., V. Motion Adaptive Deinterlacer for DMD (Digital Micromirror Device) Based Digital Television, IEEE 1994 International Conference on Consumer Electronics, Jun. 1994, pp. 340-341.*

* cited by examiner

*Primary Examiner*—Russell Frejd
(74) *Attorney, Agent, or Firm*—McAndrews, Held & Malloy, Ltd.

(57) ABSTRACT

In a video system, a method and system for efficient design verification of a motion adaptive deinterlacer (MAD) are provided. A MAD reference model may be configured via a configuration file to generate test parameters for the verification of a MAD hardware model. Test-bench interface drivers and a verification monitor may be utilized to transfer test parameters to the MAD hardware model and to verify simulated results. Modes of verification may comprise a normal mode, a pixel processing mode, and a field controller mode. During the normal mode, simulated pixel information and register settings generated by the pixel processor and field controller in the MAD hardware model may be compared to expected pixel information and register settings generated by the MAD reference model. During the pixel processing mode, expected and simulated pixel information may be compared. During the field controller mode, expected and simulated register settings may be compared.

48 Claims, 11 Drawing Sheets

METHOD AND SYSTEM FOR EFFICIENT DESIGN VERIFICATION OF A MOTION ADAPTIVE DEINTERLACER

CROSS-REFERENCE TO RELATED APPLICATIONS/INCORPORATION BY REFERENCE

This patent application makes reference to, claims priority to and claims benefit from U.S. Provisional Patent Application Ser. No. 60/613,660 filed on Sep. 28, 2004.

This application makes reference to:
U.S. application Ser. No. 10/945,769 filed Sep. 21, 2004, now U.S. Pat. No. 7,397,515;
U.S. application Ser. No. 10/875,422 filed Jun. 24, 2004, now U.S. Pat. No. 7,274,403;
U.S. application Ser. No. 10/945,619 filed Sep. 21, 2004, now U.S. Pat. No. 7,349,028;
U.S. application Ser. No. 10/945,587 filed Sep. 21, 2004;
U.S. application Ser. No. 10/871,758 filed Jun. 17, 2004;
U.S. application Ser. No. 10/945,796 filed Sep. 21, 2004, now U.S. Pat. No. 7,349,026;
U.S. application Ser. No. 10/945,817 filed Sep. 21, 2004;
U.S. application Ser. No. 10/945,729 filed Sep. 21, 2004, now U.S. Pat. No. 7,483,077;
U.S. application Ser. No. 10/945,828 filed Sep. 21, 2004, now U.S. Pat. No. 7,355,651;
U.S. application Ser. No. 10/946,152 filed Sep. 21, 2004;
U.S. application Ser. No. 10/871,649 filed Jun. 17, 2004;
U.S. application Ser. No. 10/946,153 filed Sep. 21, 2004, now U.S. Pat. No. 7,412,096;
U.S. application Ser. No. 10/945,645 filed Sep. 21, 2004; and
U.S. application Ser. No. 11/005,647 filed Dec. 6, 2004.

The above stated applications are hereby incorporated herein by reference in their entirety.

FIELD OF THE INVENTION

Certain embodiments of the invention relate to the design verification of video processing systems. More specifically, certain embodiments of the invention relate to a method and system for efficient design verification of a motion adaptive deinterlacer.

BACKGROUND OF THE INVENTION

In video system applications, a picture is displayed on a television or a computer screen by scanning an electrical signal horizontally across the screen one line at a time using a scanning circuit. The amplitude of the signal at any one point on the line represents the brightness level at that point on the screen. When a horizontal line scan is completed, the scanning circuit is notified to retrace to the left edge of the screen and start scanning the next line provided by the electrical signal. Starting at the top of the screen, all the lines to be displayed are scanned by the scanning circuit in this manner. A frame contains all the elements of a picture. The frame contains the information of the lines that make up the image or picture and the associated synchronization signals that allow the scanning circuit to trace the lines from left to right and from top to bottom.

There may be two different types of picture or image scanning in a video system. For some television signals, the scanning may be interlaced video format, while for some computer signals the scanning may be progressive or non-interlaced video format Interlaced video occurs when each frame is divided into two separate sub-pictures or fields. These fields may have originated at the same time or at subsequent time instances. A field may be a top field type or a bottom field type based on whether it comprises the first horizontal line or the second horizontal line of a video frame. The interlaced picture may be produced by first scanning the horizontal lines for the first field and then retracing to the top of the screen and then scanning the horizontal lines for the second field. The progressive, or non-interlaced, video format may be produced by scanning all of the horizontal lines of a frame in one pass from top to bottom.

There has been for many years problems associated with supporting both interlaced content and interlaced displays along with progressive content and progressive displays. Many advanced video systems support either one format or the other format. As a result, deinterlacers, devices or systems that convert interlaced video format into progressive video format, became an important component in many video systems.

However, the design and implementation of deinterlacers in integrated circuits (ICs) may be very complex since many different subsystems are necessary to perform and/or control the operations that convert interlaced video format into progressive video format. As a result, the operation and/or functionality of the many different subsystems that comprise these complex architectures may be very difficult to verify during the design phase. Moreover, the operation and/or functionality of deinterlacers may dynamically change since the contents of a video field stream may be changing with time. This difficulty persists whether benchtests generated for verification are developed for deinterlacer hardware models based on a Register Transfer Level (RTL) description or on representations based on hardware description languages (HDLs) such as Verilog or VHDL. For example, hundreds or even thousands of video fields may be necessary to verify a portion of the operations in a specific hardware implementation of a deinterlacer. In this regard, finding and isolating design flaws may be very time consuming and may lead to either an incomplete verification of a deinterlacer system or to a prolonged verification period which may adversely affect the time to market of a product.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Certain embodiments of the invention may be found in a method and system for efficient design verification of a motion adaptive deinterlacer. Aspects of the method may comprise selecting a portion of a motion adaptive deinterlacer (MAD) hardware model for verification. A plurality of test parameters may be generated in a MAD reference model to verify the selected portion of the MAD hardware model. The MAD hardware model may generate a plurality of simulation parameters based on at least a portion the test parameters. The simulation parameters may be compared with at least a portion of the test parameters generated by the MAD reference model.

A verification mode may be selected for the MAD hardware model from a normal verification mode, a pixel processing verification mode, and a field controller verification mode. A pixel processor and a field controller may be selected as the portion of the MAD hardware model to verify when the normal verification mode is selected. The pixel processor may be selected as the portion of the MAD hardware model to verify when the pixel processing verification mode is selected. The field controller may be selected as the portion of the MAD hardware model when the field controller verification mode is selected.

Aspects of the method may also comprise transferring at least a portion of the test parameters generated by the MAD reference model to a plurality of test-bench interface drivers. The test parameters may comprise a plurality of input pixel information, a plurality of expected pixel information, a plurality of input register settings, and a plurality of expected register settings when the normal verification mode is selected. The test parameters may comprise input pixel information and expected pixel information when the pixel processing verification mode is selected. The test parameters may comprise input register settings and expected register settings when the field controller verification mode is selected. The test-bench interface drivers may comprise a pixel information interface driver and a register bus driver. Input pixel information may be transferred to the pixel information interface driver and expected pixel information to a verification monitor. Input register settings and expected register settings may be transferred to the register bus driver.

In another aspect of the method, a plurality of simulated pixel information and a plurality of simulated register settings generated by the selected portion of the MAD hardware model may be compared with the expected pixel information and the expected register settings when the normal verification mode is selected. The simulated pixel information generated by the selected portion of the MAD hardware model may be compared with the expected pixel information when the pixel processing verification mode is selected. Moreover, the simulated register settings generated by the selected portion of the MAD hardware model may be compared with the expected register settings when the field controller verification mode is selected.

Another embodiment of the invention may provide a machine-readable storage, having stored thereon, a computer program having at least one code section executable by a machine, thereby causing the machine to perform the steps as described above for efficient design verification of a motion adaptive deinterlacer.

Aspects of the system may comprise at least one processor that selects a portion of a MAD hardware model for verification. The processor may generate a plurality of test parameters to verify the selected portion of the MAD hardware model. The MAD hardware model may generate a plurality of simulation parameters based on at least a portion the test parameters. The processor may compare the simulation parameters with at least a portion of the test parameters. At least one memory may be utilized that stores a configuration file for generating the test parameters.

The processor may select a verification mode for the MAD hardware model from a normal verification mode, a pixel processing verification mode, and a field controller verification mode. The processor may select a pixel processor and a field controller as the selected portion of the MAD hardware model when the normal verification mode is selected. The processor may select the pixel processor as the selected portion of the MAD hardware model when the pixel processing verification mode is selected. The processor may select the field controller as the selected portion of the MAD hardware model when the field controller verification mode is selected.

In another aspect of the system, the processor may compare a plurality of simulated pixel information and a plurality of simulated register settings generated by the selected portion of the MAD hardware model with a plurality of expected pixel information and a plurality of expected register settings when the normal verification mode is selected. The processor may compare simulated pixel information generated by the selected portion of the MAD hardware model with a expected pixel information when the pixel processing verification mode is selected. Moreover, the processor may compare simulated register settings generated by the selected portion of the MAD hardware model with expected register settings when the field controller verification mode is selected.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for efficient design verification of a motion adaptive deinterlacer (MAD). Certain aspects of the invention may comprise selecting a portion of a MAD hardware model for design verification. The MAD hardware model may comprise, for example, a pixel processing portion and a field controlling portion. The verification mode may depend on whether the pixel processing portion, the field controlling portion, or both are selected for verification. A MAD reference model may be utilized to generate test parameters from which to verify the operation and functionality of the MAD hardware model. This approach may result in a more efficient verification of a deinterlacer system architecture by providing the ability to isolate different design portions during verification. In this regard, efficiently finding and isolating design flaws may lead to either a more complete verification and/or a reduced verification time for the deinterlacer system.

Figure 1:
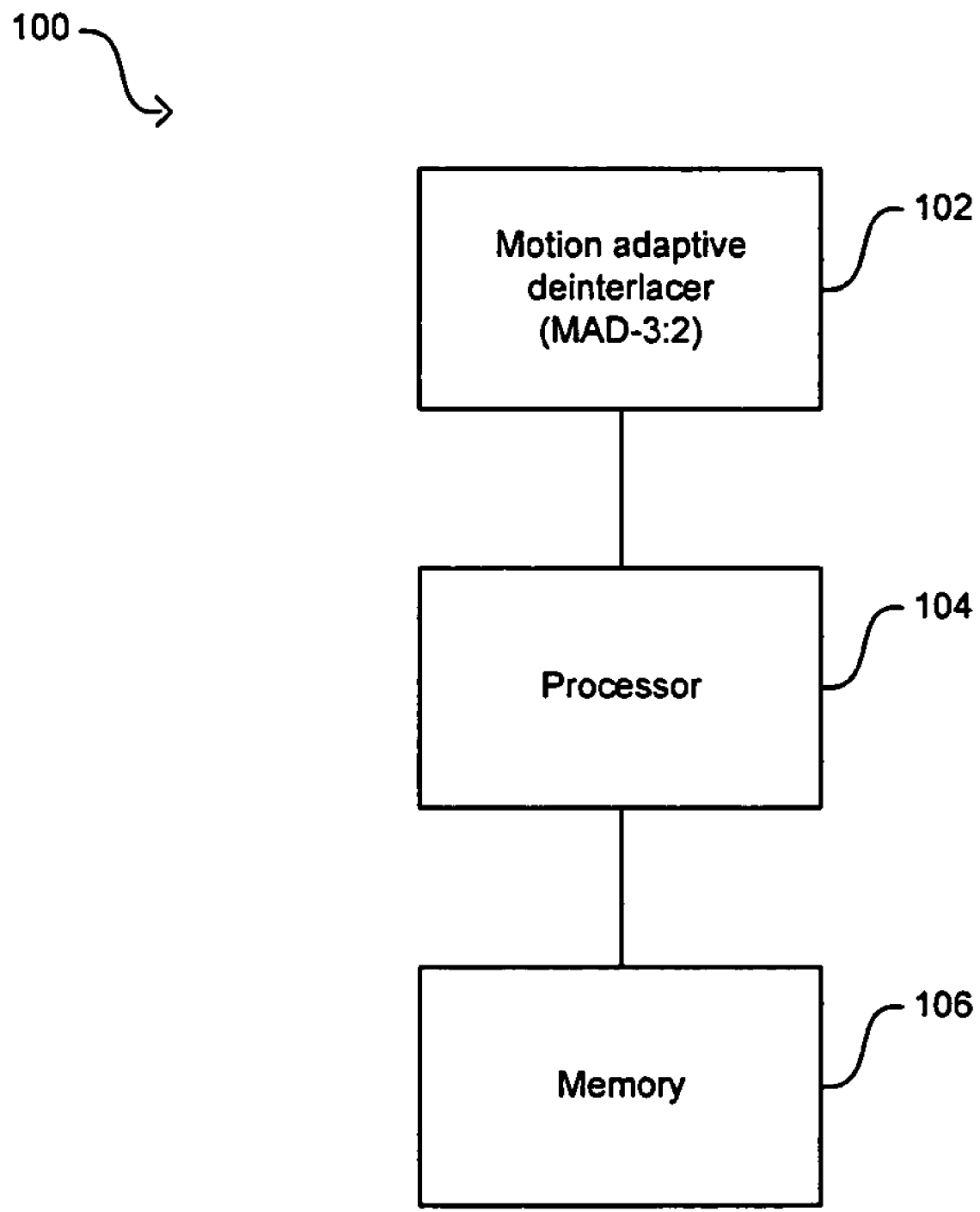
FIG. 1 illustrates a high level block diagram of a deinterlacing system, in accordance with an embodiment of the invention.

FIG. 1 illustrates a high level block diagram of a deinterlacing system, in accordance with an embodiment of the invention. Referring to FIG. 1, the deinterlacer system 100 may comprise a motion adaptive deinterlacer, such as a motion adaptive deinterlacer with reverse 3:2 pull-down (MAD-3:2) 102, a processor 104, and a memory 106. The MAD-3:2 102 may comprise suitable logic, circuitry, and/or code that may be adapted to deinterlace video fields. The processor 104 may comprise suitable logic, circuitry, and/or code that may be adapted to control the operation of the MAD-3:2 102, to perform at least a portion of the operation of the MAD-3:2 102, and/or to transfer control information and/or data to and from the memory 106. The memory 106 may comprise suitable logic, circuitry, and/or code that may be adapted to store control information, data, information regarding current video fields, and/or information regarding prior video fields in a video field stream.

The MAD-3:2 102 may be capable of reverse 3:2 pull-down and 3:2 pull-down cadence detection which may be utilized in a video network (VN). The MAD-3:2 102 may also be adapted to acquire interlaced video fields from one of a plurality of video sources in the video network and convert the acquired interlaced video fields into progressive frames, at double the display rate, in a visually pleasing manner.

The MAD-3:2 102 may be adapted to accept interlaced video input from a network video input bus and output deinterlaced, progressive video to a network video output bus. The MAD-3:2 102 may accept up to, for example, 720×480i, where i refers to interlaced video, and produce, for example, 720×480p, where p refers to progressive video, in the case of the National Television System Committee (NTSC) standard. For the Phase Alternation by Line (PAL) video standard, for example, the MAD-3:2 102 may accept 720×576i and produce 720×576p. In some instances, horizontal resolution may be allowed to change on a field by field basis up to, for example, a width of 720. The MAD-3:2 102 may be adapted to smoothly blend various approximations for the missing pixels to prevent visible contours produced by changing decisions. A plurality of fields of video may be utilized to determine motion. For example, in an embodiment of the invention, five fields of video may be utilized to determine motion.

The MAD-3:2 102 may produce stable non-jittery video with reduced risk of visual artifacts due to motion being misinterpreted while also providing improved still frame performance. The MAD-3:2 102 may also provide additional fields per field type of quantized motion information which may be selectable in order to reduce the risk of misinterpretation. For example, up to three (3) additional fields or more, per field type, of quantized motion information may optionally be selected in order to reduce risk of misinterpreted motion even further. This may provide a total historical motion window of up to, for example, 10 fields in a cost effective manner. In this regard, historical motion may refer to previously determined motion values at corresponding pixel locations in previously occurring fields. Integrated cross-chrominance removal functionality may also be provided, which may aid in mitigating or eliminating NTSC comb artifacts. A directional compass filtering may also be provided that reduces or eliminates jaggies in moving diagonal edges. The MAD-3:2 102 may also provide reverse 3:2 pull-down for improved quality from film based sources. The MAD-3:2 102 may also be adapted to support a variety of sources.

In operation, the MAD-3:2 102 may receive interlaced fields and may convert those deinterlaced fields into progressive frames, at double the display rate. A portion of the information regarding fields that occurred prior to the current field being deinterlaced may be stored locally in the MAD-3:2. A portion of the information regarding fields that occurred after the current field being deinterlaced may also be stored locally in the MAD-3:2. A remaining portion of the information regarding fields that occurred prior to and after the current field may be stored in the memory 106, for example.

The processor 104 may control the operation of the MAD-3:2 102. For example, the processor 104 may select from a plurality of deinterlacing algorithms, a deinterlacing algorithm that may be utilized by the MAD-3:2 102. The processor 104 may be adapted to modify the MAD-3:2 102 based on a corresponding source of the video fields. Moreover, the processor 104 may transfer to the MAD-3:2 102, information stored in the memory 106. The processor 104 may also transfer to the memory 106, any field-related information not locally stored in the MAD-3:2 102. The MAD-3:2 102 may then use information from the current field, information from previously occurring fields, and information from fields that occurred after the current field, to construct a pixel constellation and determine a current motion for the output pixel under consideration based on the information in the pixel constellation. A value for the output pixel may be determined based on the current motion and on at least one historical motion value determined for a previous field, where the historical motion may be quantized to reduce storage.

Figure 2:
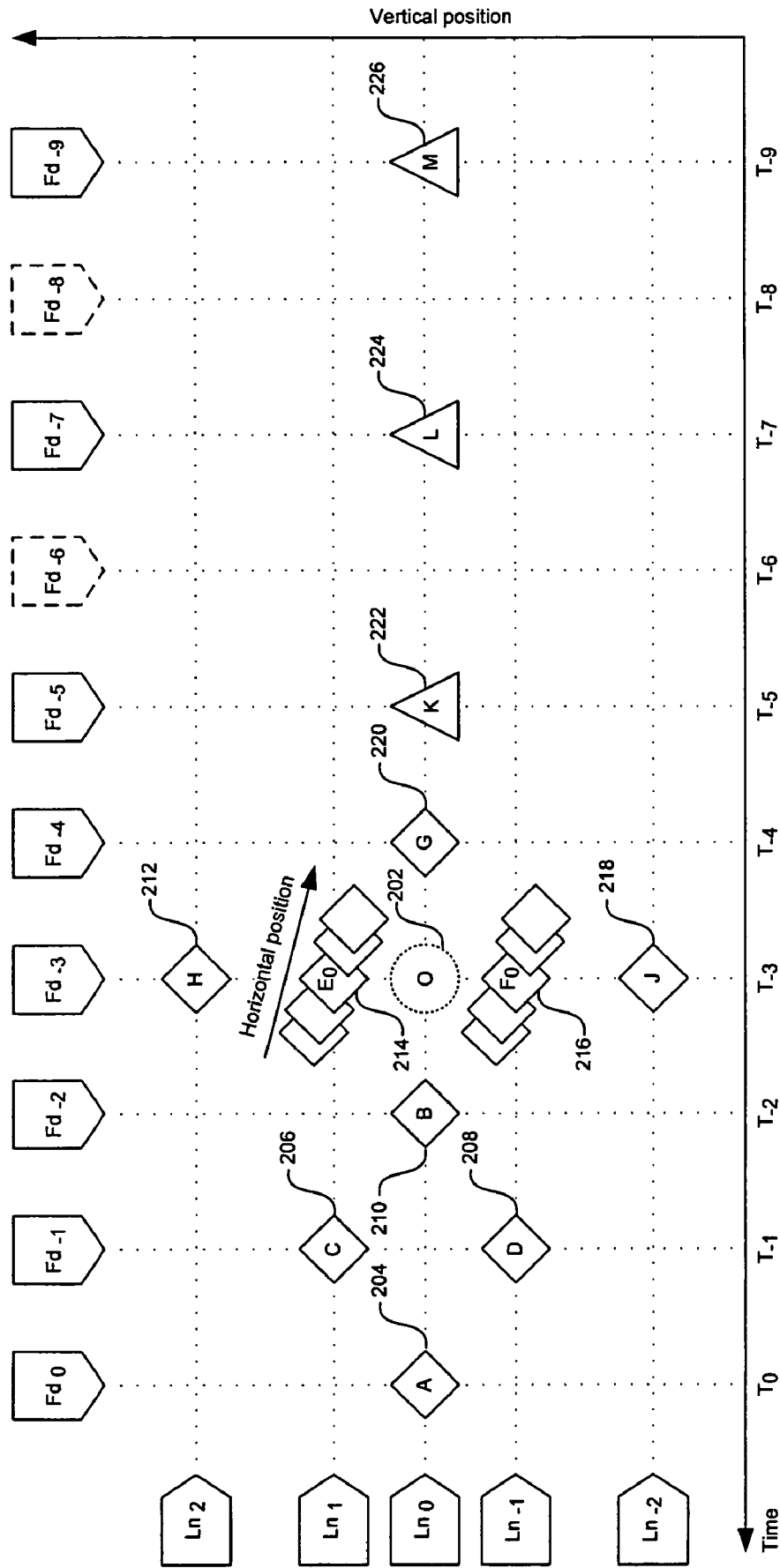
FIG. 2 illustrates an exemplary pixel constellation with locations for quantized historical motion values, in accordance with an embodiment of the invention.

FIG. 2 illustrates an exemplary pixel constellation with locations for quantized historical motion values, in accordance with an embodiment of the present invention. Referring to FIG. 2, the pixel constellation used by the MAD-3:2 102 to determine the motion-adapted value of the output pixel may comprise a pixel (A) 204 in present line $Ln_0$ of field $Fd_0$, a pixel (C) 206 in present line $Ln_1$ of field $Fd_{-1}$, a pixel (D) 208 in present line $Ln_{-1}$ of field $Fd_{-1}$, a pixel (B) 210 in present line $Ln_0$ of field $Fd_{-2}$, a pixel (H) 212 in present line $Ln_2$ of field $Fd_{-3}$, a pixel ($E_0$) 214 in present line $Ln_1$ of field $Fd_{-3}$, a pixel ($F_0$) 216 in present line $Ln_{-1}$ of field $Fd_{-3}$, a pixel (J) 218 in present line $Ln_{-2}$ of field $Fd_{-3}$, an output pixel (O) 202 in absent line $Ln_0$ of field $Fd_{-3}$, a pixel (G) 220 in present line $Ln_0$ of field $Fd_{-4}$, a quantized historical motion value K 222 in field $Fd_{-5}$, a quantized historical motion value L 224 in field $Fd_{-7}$, and a quantized historical motion value M 226 in field $Fd_{-9}$. With reference to FIG. 2, time $T_0$ is shown on the left and fields to the right of $T_0$ are back in time from reference point $T_0$.

The gaps in historical motion information at $Fd_{-6}$ and $Fd_{-8}$ are due to the inclusion of historical motion information from fields of the same field type, whether top or bottom fields, as the current field. The choice to use quantized motion allows for an increased range in time of fields, with minimal cost in gates or bandwidth. The benefit of this increased range in time fields being improved deinterlacing quality in the MAD-3:2 102 due to a reduced occurrence of motion aliasing.

Figure 3:
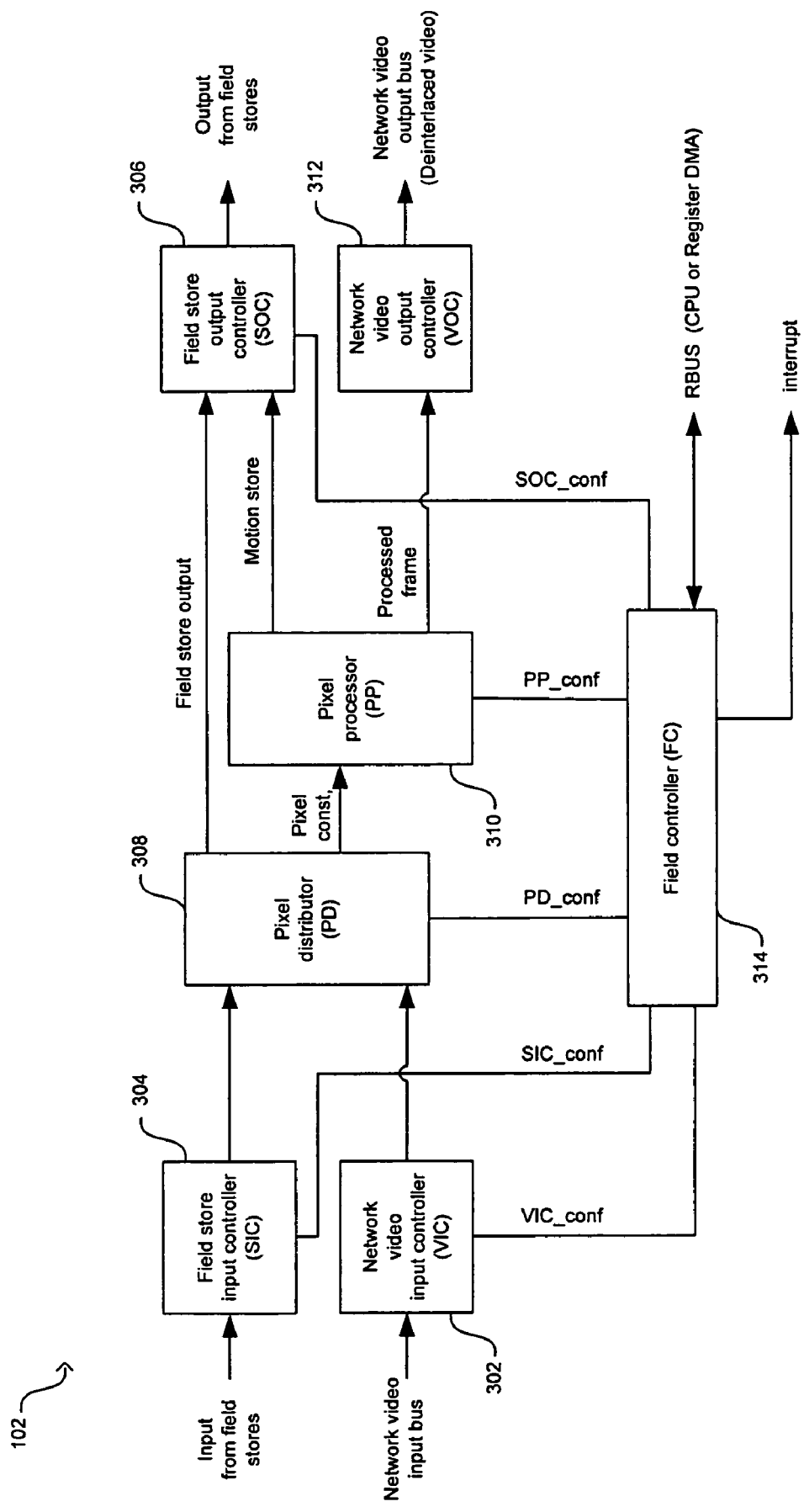
FIG. 3 is a block diagram of an exemplary MAD, in accordance with an embodiment of the invention.

FIG. 3 is a block diagram of an exemplary MAD, in accordance with an embodiment of the invention. Referring to FIG. 3, the MAD-3:2 102 in FIG. 1 may comprise a network video input controller (VIC) 302, a field store input controller (SIC) 304, a field store output controller (SOC) 306, a pixel distributor (PD) 308, a pixel processor (PP) 310, a network video output controller (VOC) 312, and a field controller (FC) 314. The network video input controller 302 may comprise suitable logic, circuitry, and/or code that may be adapted to receive input from a network video input bus, to potentially scale up horizontally, and to provide a network feed A to the pixel distributor 308.

The SIC 304 may comprise suitable logic, circuitry, and/or code that may be adapted to manage fetching of pixel information and quantized historical motion information. The SOC 312 may comprise suitable logic, circuitry, and/or code that may be adapted to manage storage of pixel information and quantized historical motion information. The PD 308 may comprise suitable logic, circuitry, and/or code that may be adapted to accept pixel information and quantized historical motion information from the SIC 304 and from the VIC 302 and provide the constellation of pixels described in FIG. 2 to the PP 310.

The VOC 312 may comprise suitable logic, circuitry, and/or code that may be adapted to prepare the processed frame for transmission as a progressive or deinterlaced output over a network video output bus. The FC 314 may comprise suitable logic, circuitry, and/or code that may be adapted to manage the transfer and processing of pixel and quantized historical motion information and to modify and update registers used to manage the transfer and processing of pixel and quantized historical motion information. The FC 314 may transfer data and/or control information to and from the memory 106 via the processor 104, for example. In this regard, the FC 314 may utilize an RBUS bus for the transfer of data and/or control information. The PP 310 may comprise suitable logic, circuitry, and/or code that may be adapted to convert from linear array of pixels to a raster or processed frame format.

In operation, the FC 314 may configure the operation of the VIC 302, the SIC 304, the SOC 306, the VOC 312, the PD 308, and the PP 310 in accordance to the current field being processed. In this regard, the FC 314 may generate a plurality of VIC configuration (VIC_conf) signals, a plurality of SIC configuration (SIC_conf) signals, a plurality of PD configuration (PD_conf) signals, a plurality of PP configuration (PP_conf) signals, a plurality of SOC configuration (SOC_conf) signals, and a plurality of VOC configuration (VOC_conf) signals. One of these signals may be a Field_start_probe signal which may be utilized to indicate a start of a new video field. The FC 314 may be adapted to provide a start-up configuration and may also be adapted to provide a shut-down configuration for the MAD-3:2 102. The PD 308 may generate a pixel constellation from the field information received from the VIC 302 and the previous field stores received from the SIC 304. The PP 310 may generate a processed frame from the pixel constellation information received and may transfer that processed frame to the VOC 312. The VOC 312 may transfer the processed frame to the network video output bus, for example. The PP 310 may generate a plurality of statistical information which may be transferred to the FC 314. The FC 314 may utilize the statistical information to update and/or modify certain register settings which in turn may be utilized to modify the configuration of the VIC 302, the SIC 304, the SOC 306, the VOC 312, the PD 308, and the PP 310. The PP 310 may also transfer motion information generated from processing the pixel constellation to the SOC 306. The SOC 306 may then transfer the motion information to, for example, the memory 106 in FIG. 1 for storage.

Figure 4:
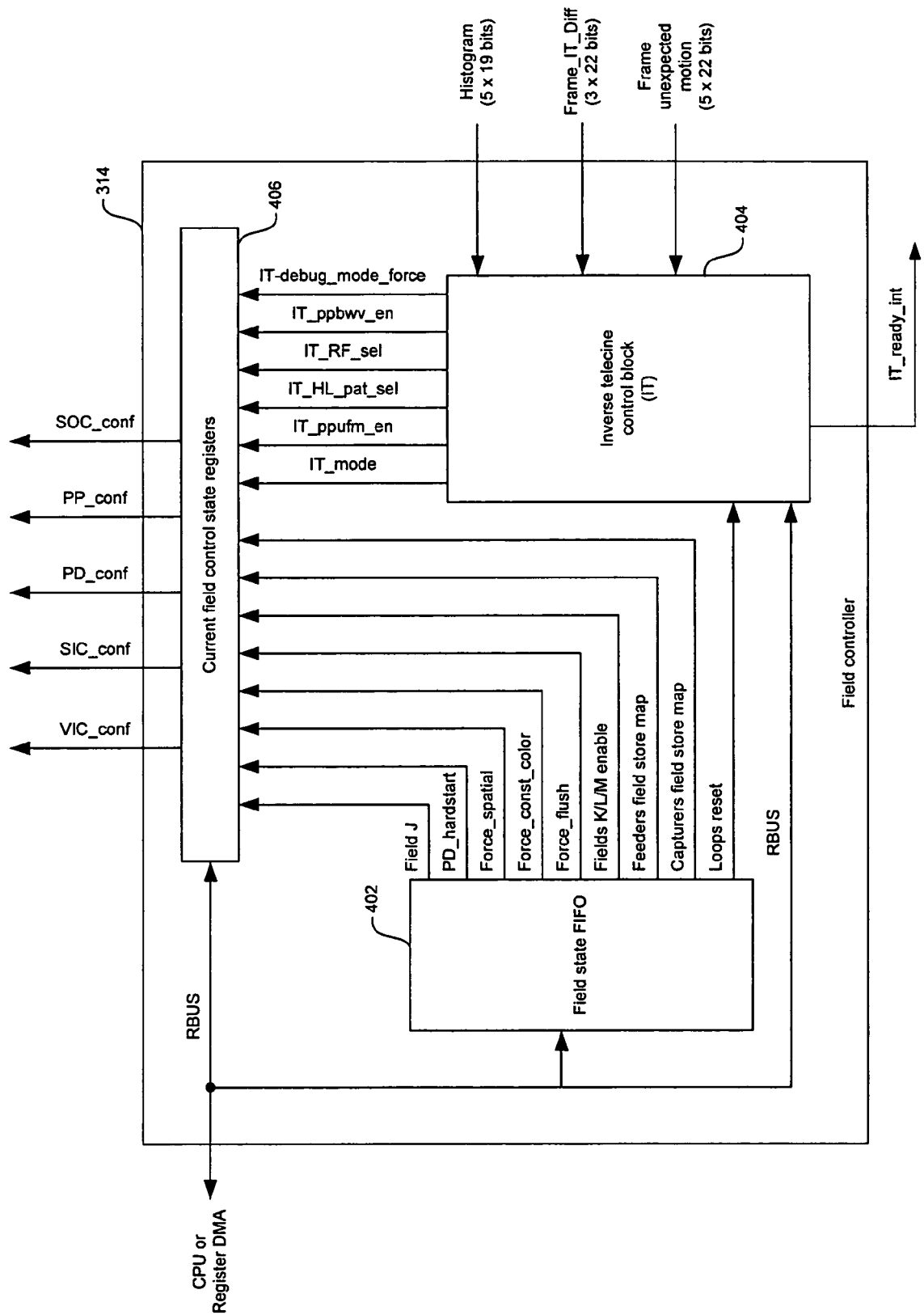
FIG. 4 is a block diagram of an exemplary field controller that may be utilized in a motion adaptive deinterlacer capable of reverse pull-down, in accordance with an embodiment of the invention.

FIG. 4 is a block diagram of an exemplary field controller that may be utilized in a MAD capable of reverse pull-down, in accordance with an embodiment of the invention. Referring to FIG. 4, the field controller 314 may comprise a field state FIFO 402, an inverse telecine (IT) control block 404, and a current field control state registers 406. The field state FIFO 402 may comprise suitable logic, circuitry, and/or code that may be adapted to handle the interface between software and hardware control of the MAD-3:2 102 in FIG. 1. The inverse telecine 404 may comprise suitable logic, circuitry, and/or code that may be adapted to facilitate detection of a 3:2 or potentially 2:2 pull-down and then provide the correct control to the PP 310 to allow reverse 3:2 pull-down or 2:2 pull-down to occur. The current field control state registers 406 may comprise suitable logic, circuitry, and/or code that may be adapted to contain registers and/or storage elements that may be utilized for modifying and/or updating the operation of the VIC 302, the SIC 304, the SOC 306, the VOC 312, the PD 308, and the PP 310.

The field state FIFO 402 may be adapted to provide a simplified interface between the deinterlacer and the processor 104 in FIG. 1 via the RBUS bus, for example. The field state FIFO 402 may be adapted to know the state of all the field stores and start and stop transitions so that a system software may give a single command for each field without having to keep any records of what happened in previous fields. The field state FIFO 402 may be adapted to maintain automatic control of field stores and to ensure that the correct field store is read or written by a given feeder at the right time. By utilizing a force spatial operating mode, for example, the field state FIFO 402 may be adapted to handle the timing associated with enabling and disabling the temporal approximation options for deinterlacing that may be provided in the PP 310. The force spatial operation mode may be adapted to automatically prevent unwanted visual artifacts from occurring during field type discrepancies and startup and shutdown procedures. The use of the force spatial operation mode may be indicated by the Force_spatial signal to the current field control state registers 406.

The field state FIFO 402 may also be adapted to provide, for example, a software selectable hard start mode of operation which may be indicated by the PD_hardstart signal. The software selectable hard start mode may be adapted to control the SIC 304 and the PD 308 to allow the first field to be repeated a plurality of times, for example, four times. The pixel and motion information feeders in the SIC 304 may be controlled by the Feeders field store map signal from the field state FIFO 402, for example, while the pixel constellation generated by the PD 308 may be controlled by the Field J signal and the Fields K/L/M signals, for example. By repeating a first field multiple times, a much cleaner output for the display may be generated during the transition time required for startup of the deinterlacer. If this is not provided in hardware, the procedures for controlling the multiple fields in the deinterlacer may be much more complex to implement in software. The hard start mode may also be adapted to maintain a constant color during the transition period. This constant color mode may be indicated by the Force_const_color signal. If the multi-field control operation were not handled in hardware, then holding a constant color during the transition period using software would be a more complex operation. The value used for the constant color may be generated or may be retrieved from memory.

The field state FIFO 402 may also be adapted to provide a software selectable flush mode which may be indicated by the Force_flush signal. The software selectable flush mode may be configured to control the VIC 302 to allow pictures currently held in the field stores to be output to the display without having to supply new fields on the network video input bus. This provides a much cleaner output for display during the transition periods such as during shut down of the deinterlacer or during switching to a new signal source. The field state FIFO 402 may also be adapted to indicate via a Capturers field store map signal, for example, to capturers in the SOC 306 of a corresponding mapping of the information being stored. The field state FIFO 402 may also provide a Loops reset signal to the IT control block 404 that may be utilized with the statistical information received by the IT control block 404 for properly detecting reverse 3:2 pull-down.

The IT control block 404 may be adapted to have two control paths. The IT control block 404 may be utilized to detect reverse 3:2 pull-down and provide the correct signals to the PP 310 via the current field control state registers 406 for reverse 3:2 pull-down to occur. Alternatively, the processor 104 of FIG. 1 may be utilized to implement more complex 3:2 detection or potentially may be utilized to provide 2:2 detection. The processor 104 may then be responsible for programming the registers in the current field control state registers 406 directly via the RBUS bus or indirectly via the IT control block 404 such that the required weave may be performed by the PP 310. The pipelining of inputs and outputs to the IT control block 404 may ensure that the processor 104 has almost an entire field time in which to perform its tasks.

The IT control block 404 may be also adapted to generate and/or transfer a plurality of signals to the current field control state registers 406 that may be utilized to configure the reverse 3:2 pull-down operation of the PP 310. For example, the IT control block 404 may transfer signals IT mode, IT_ppufm_en, IT_HL_pat_sel, IT_RF_sel, IT_ppbwv_en, and IT_debug_mode_force to the current field control state registers 406. The IT mode signal may be utilized to indicate the weave direction, for example. The IT_ppufm_en signal may be utilized to enable per pixel correction with an unexpected field motion, for example. The IT_HL_pat_sel signal may be utilized to indicate a selection of one of a plurality of interfield HIGH and LOW patterns utilized for the per-pixel unexpected field motion, for example. The IT_RF_sel signal may be utilized to select which pixels in the constellation are expected to see a repeat field, for example. The IT_ppbwv_en signal may be utilized to enable bad weave correction, for example. The IT_debug_mode_force may be utilized to indicate a debug mode of operation. The IT control block 404 may also be adapted to generate an interrupt signal, IT_ready_int, to the processor 104, for example, to indicate to the processor 104 that statistics from the field are complete and are ready to be read.

The IT control block 404 may also be adapted to receive statistical information from the PP 310. The statistical information may comprise a histogram signal, a Frame_IT_diff signal, and/or a Frame unexpected motion signal. This statistical information may be accessed by the processor 104 for complex 3:2 detection or potentially 2:2 detection when the processor-based alternative control path is selected.

The current field control state registers 406 may be set at the beginning of a field, for example, just before the feeders to the PP 310 are given their trigger signals to start reading data. The current field control state registers 406 may be held constant for the entire field. The transitions of the outputs of the field state FIFO 402 and/or the IT control block 404 to the current field control state registers 406 may be disabled so that those state registers may be programmed via, for example, the RBUS bus. In cases where the state comes from the field state FIFO 402, there may be two paths for setting the state registers. Either they may be programmed directly and then the deinterlacer may be activated for a new field, or the processor 104 in FIG. 1 may set registers in the field state FIFO 402 and enable the deinterlacer. Once the new state is determined, it may be loaded into the current field control state registers 406 and the feeders to the PP 310 may be activated. The current field control state registers 906 involved in inverse telecine may either be updated directly over RBUS or the inverse telecine 904 may prepare the next new state. This new state may also be transferred just before the feeders are given their triggers to start.

Figure 5:
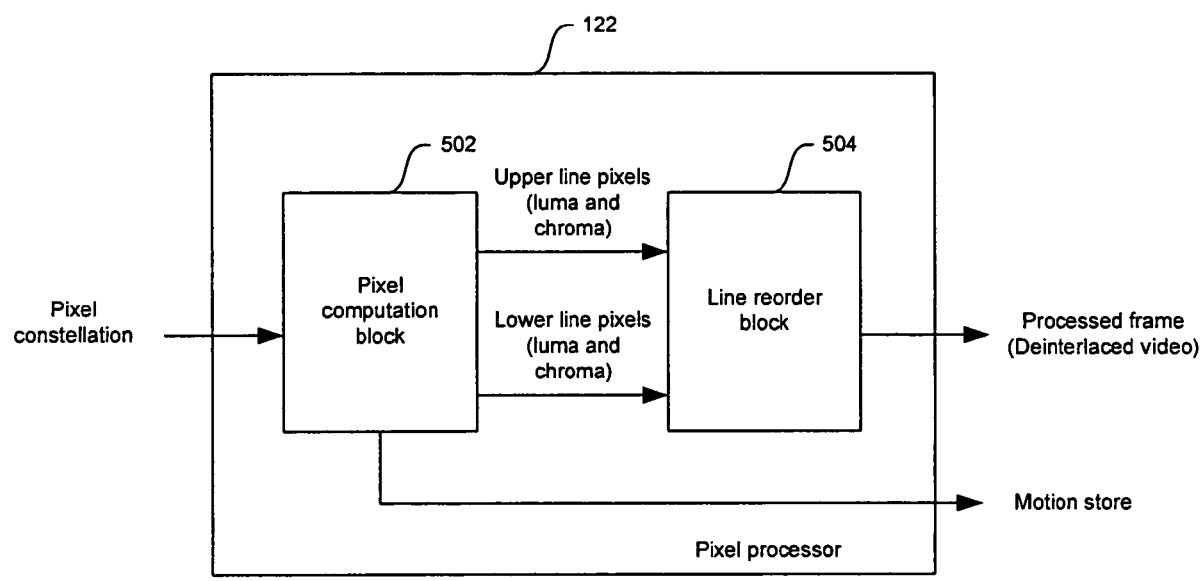
FIG. 5 is a block diagram of an exemplary pixel processor that may be utilized in a motion adaptive deinterlacer, in accordance with an embodiment of the invention.

FIG. 5 is a block diagram of an exemplary pixel processor that may be utilized in a MAD, in accordance with an embodiment of the invention. Referring to FIG. 5, the pixel processor 310 may comprise a pixel computation block 502 and a line reorder block 504. The pixel computation block 502 may comprise suitable logic, circuitry, and/or code that may be adapted to produce two lines of output pixels from the information in the pixel constellation provided by the PD 308, upper level control signals provided by the FC 314, and/or calculations it performs. The pixel computation block 502 may also be adapted to generate motion information that may be transferred to the SOC 306. The line reorder block 504 may comprise suitable logic, circuitry, and/or code that may be adapted to take two vertically adjacent pixels at, for example, 480 interlaced (480i) rate from the pixel computation block 502 and buffer them so that two lines may be output sequentially at, for example, 480 progressive (480p) rate. The line reorder block 504 may not be limited to 480i to 480p rate conversion but may be programmable and may accept a plurality of rate conversions. The processed frame generated by the line reorder block 504 may be transferred to the VOC 312. The Force_spatial signal from the FC 314 may be utilized to indicate to the pixel computation block 502 that a deinterlaced luma value for an output pixel may be passed through a compass filter. The Force_spatial signal may also be utilized to indicate that cross-chroma removal at the pixel computation block 502 may be disabled.

Figure 6:
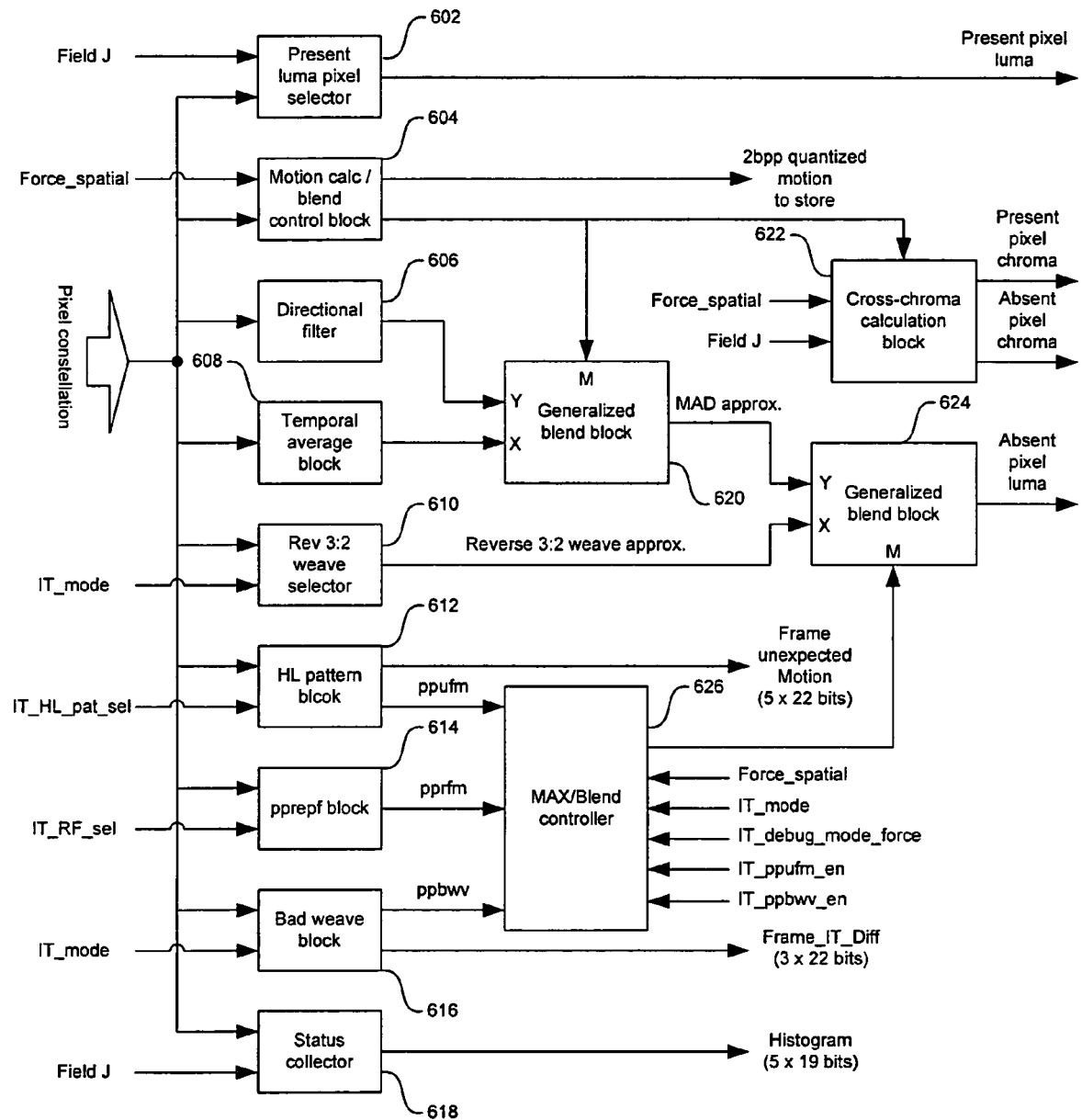
FIG. 6 is a block diagram of an exemplary pixel computation block that may be utilized in a motion adaptive deinterlacer, in accordance with an embodiment of the invention.

FIG. 6 is a block diagram of an exemplary pixel computation block that may be utilized in a MAD, in accordance with an embodiment of the invention. Referring to FIG. 6, the pixel computation block 502 in FIG. 5 may comprise a present luma pixel selector 602, a motion calculation and blend control block 604, a directional filter 606, a temporal average block 608, a reverse 3:2 weave selector 610, an HL pattern block 612, a per-pixel repeat field motion (ppref) block 614, a bad weave block 616, a status collector 618, a first generalized blend block 620, a cross-chroma calculation block 622, a second generalized blend block 624, and a MAX/blend controller 626. In some instances, the pixel computation block 502 may also comprise a pixel order block that may be utilized to order the outputs of the present luma pixel selector 602, the cross-chroma calculation block 622, and the second generalized blend block 624 so as to properly interface with the line reorder block 504 in FIG. 5. In this regard, the present pixel and absent pixel luma and chroma information may be ordered into upper line pixels and lower line pixels in accordance with the field type as shown in FIG. 5.

The present luma pixel selector block 602 may comprise suitable logic, circuitry, and/or code that may be adapted to select the luma pixel from the present line of pixels as provided by the current field in the pixel constellation. When the input field is a top field, this pixel is pixel $E_0$ 214 in FIG. 2. When the input field is a bottom field, this pixel is pixel $F_0$ 216 in FIG. 2. The motion calculation and blend control block 604 may comprise suitable logic, circuitry, and/or code that may be adapted to calculate a current motion, a historical motion, and a final motion for the output pixel O 202 in FIG. 2. The motion calculation and blend control block 604 may also produce a quantized motion value that may be stored. The motion calculation and blend control block 604 may be forced to provide a spatial approximation, as indicated by the Force_spatial signal from the FC 314 in FIG. 3, and therefore provide an output of, for example, 255 in an 8-bit system. This output may ensure that the blends that use the luma motion will see a very large motion and hence produce a spatial approximation in their output.

The directional filter 606 may comprise suitable logic, circuitry, and/or code that may be adapted to perform a spatial approximation that may predominate at the output of a blend operation, when large amounts of motion are measured. The temporal average block 608 may comprise suitable logic, circuitry, and/or code that may be adapted to perform a temporal averaging that may predominate at the output of a blend operation, when small amounts of motion are measured. The reverse 3:2 weave selector 610 may comprise suitable logic, circuitry, and/or code that may be adapted to provide a reverse 3:2 estimate for a pixel. The reverse 3:2 weave selector 610 may comprise a plurality of values, for example, OFF, FWD, BWD, and AVG. The IT_mode signal from the FC 314 may be utilized to indicate the value to be selected.

In an exemplary enhancement of the invention, when the value is FWD, the output of the reverse 3:2 weave selector 610 may be the luma for pixel B 210 in FIG. 2. When the value is BWD, the output may be the luma for pixel G 220 in FIG. 2. For a value of AVG, the output may be the linear average luma of pixels B 210 and G 220 in FIG. 2. When the value is OFF, any output may be provided since the MAX/blend controller 626 may ensure that this value does not affect the output of the second generalized blend block 624. The value of the reverse 3:2 weave selector 610 may be determined by the FC 314 of FIG. 3.

The HL pattern block 612 may comprise suitable logic, circuitry, and/or code that may be adapted to implement a plurality of operations to determine a per-pixel unexpected field motion (ppufm) and may also utilize summing registers to produce a frame unexpected motion value that may be used, for example, for bad edit detection. The IT_HL_pat_sel signal from the FC 314 may be utilized to indicate to the HL pattern block 612 a selected inter-field pattern. The pprepf block 614 may comprise suitable logic, circuitry, and/or code that may be adapted to implement a plurality of operations to determine a per-pixel repeat field motion (pprfm) from a per-pixel repeat field difference (pprfd) and a per-pixel repeat field threshold (pprf_thresh). The IT_RF_sel signal from the FC 314 may be utilized to indicate to the pprepf block 614 which pixels in the constellation are expected to see a repeat pattern. The bad weave block 616 may comprise suitable logic, circuitry, and/or code that may be adapted to determine a per-pixel bad weave value (ppbwv). The IT_mode signal from the FC 314 may be utilized by the bad weave block 616 in determining the ppbwv.

The status collector block 618 may comprise suitable logic, circuitry, and/or code that may be adapted to sum the field difference and to place the results into a histogram table. The values of the histogram table may be utilized by the MAD-3:2 102 to determine where a repeat field has occurred. The status collector 618 may comprise a plurality of registers which may be set or reset at the start of a new video field. The various levels of the histogram may correspond to the information stored in the registers. The status collector block 618 may utilize the Field J signal generated by the FC 314.

The first generalized blend block 620 and the second generalized blend block 624 may comprise suitable logic, circuitry, and/or code that may be adapted to blend between a spatial approximation and a temporal approximation of the motion in the output pixel O 202 in FIG. 2. The MAX/Blend controller 626 may comprise suitable logic, circuitry, and/or code that may be adapted to produce a motion value that may control a final merge between the motion adaptive deinterlacer approximation from the first generalized blend block 620 and the reverse 3:2 weave approximation from the reverse 3:2 weave selector 610. During normal operation, for example, the maximum of the two signals may be utilized to control the strength of the blend in the second generalized blend block 616. The MAX/Blend controller 626 may utilize, for example, the Force_spatial signal, the IT_mode signal, the IT_debug_mode_force signal, the IT_ppufm_en signal, and the IT_ppbwv_en signal from the FC 314. The cross-chroma calculation block 622 may comprise suitable logic, circuitry, and/or code that may be adapted to remove cross chrominance from the present pixel and produce a present pixel chroma value and an absent pixel chroma value. The cross-chroma calculation block 622 may utilize, for example, the Force_spatial and Field J signals from the FC 314.

Information for a present line pixel may comprise the present pixel luma value generated by the present luma pixel selector 602 and the present pixel chroma value generated by the cross-chroma calculation block 622. Information for an absent line pixel may comprise the absent pixel luma value generated by the second generalize blend block 624 and the absent pixel chroma value generated by the cross-chroma calculation block 622. The information from present line pixels and absent line pixels may be organized in a manner so as to construct a progressive video frame in accordance to whether the present line pixel is from a top field or a bottom field.

Figure 7:
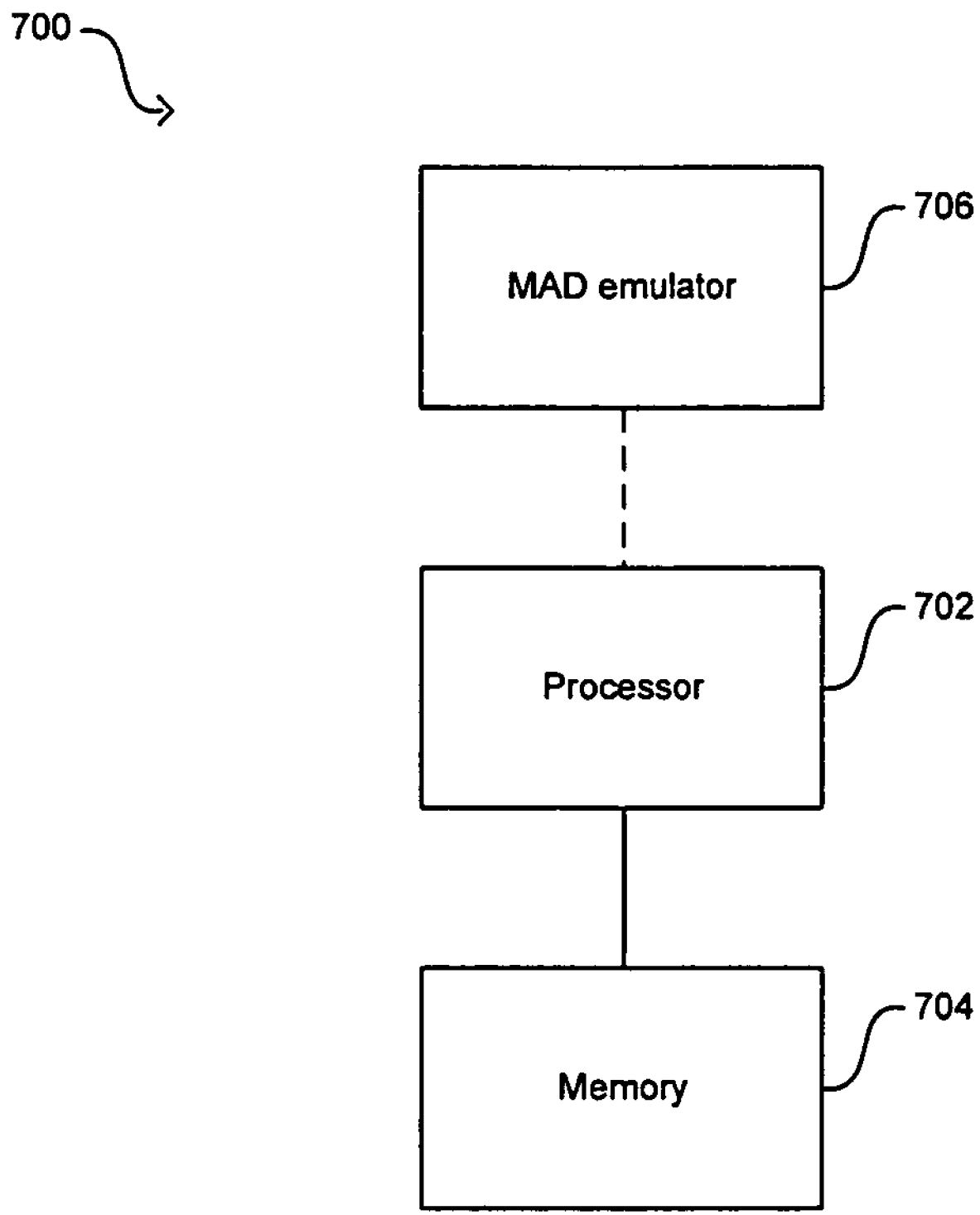
FIG. 7 is a block diagram of an exemplary MAD design verification system, in accordance with an embodiment of the invention.

FIG. 7 is a block diagram of an exemplary MAD design verification system, in accordance with an embodiment of the invention. Referring to FIG. 7, a MAD design verification system 700 may comprise a processor 702 and a memory 704. In this case, a description and/or representation of the MAD-3:2 102 in FIG. 1 may be a code and/or software representation of the hardware design to be evaluated. The code and/or software representation may be referred to as a hardware model of the design. In this regard, the hardware model may be provided in, for example, a Register Transfer Level (RTL) description or in hardware description languages (HDLs) such as Verilog or VHDL. When the description and/or representation of the MAD-3:2 102 is a hardware implementation of the hardware design to be evaluated, for example, a field programmable gate array (FPGA) or complex programmable logic device (CPLD) implementation, then the MAD design verification system 700 may also comprise an emulator 706 where the hardware model may be implemented.

Figure 8:
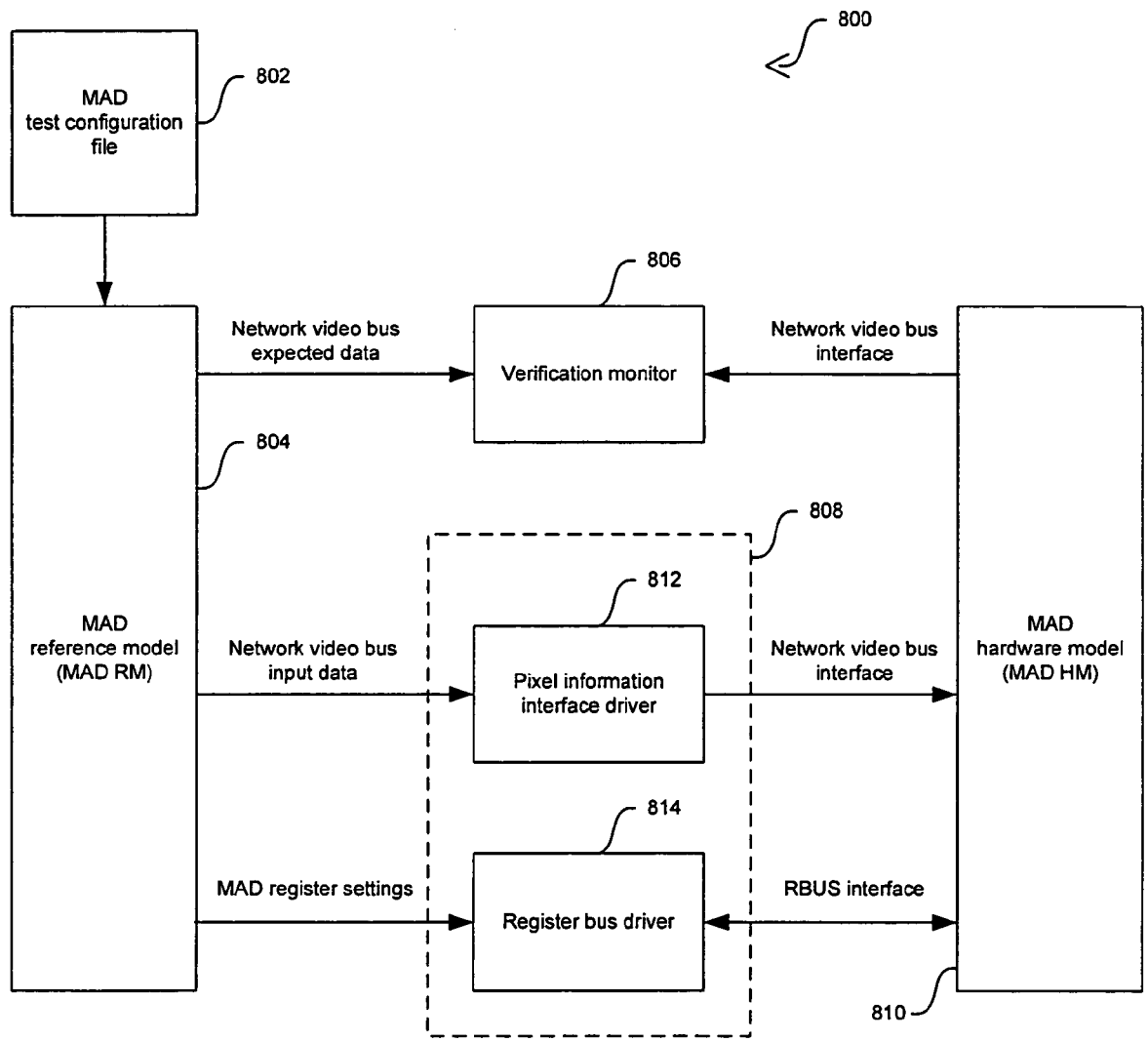
FIG. 8 is a block diagram of an exemplary MAD design verification architecture, in accordance with an embodiment of the invention.

FIG. 8 is a block diagram of an exemplary MAD design verification architecture, in accordance with an embodiment of the invention. Referring to FIG. 8, a MAD verification architecture 800 may comprise a MAD test configuration file 802, a MAD reference model (RM) 804, a verification monitor 806, a plurality of test-bench interface drivers 808, and a MAD hardware model (HM) 810. The test-bench interface drivers 808 may comprise a pixel information interface driver 812 and a register bus driver 814. The MAD verification architecture 800 may be implemented in, for example, the MAD design verification system 700 in FIG. 7. The MAD test configuration file 802 may comprise information that may be utilized to configure the MAD RM 804. In this regard, there may be a plurality of configuration files, in which each configuration file corresponds to a specified set of tests and conditions for evaluating the operation and/or functionality of a hardware design for the MAD-3:2 102 in FIG. 1. In this regard, the MAD test configuration file 802 may describe which portions of the MAD-3:2 102 hardware design may be verified. The MAD test configuration file 802 may be stored in, for example, the memory 704, and at least a portion may be retrieved from storage to configure the MAD RM 804.

The MAD RM 804 may comprise suitable logic, circuitry, and/or code that may be adapted to represent an implementation-independent behavioral description of the expected operation and/or functionality of the MAD-3:2 102. The MAD RM 804 may be implemented in code and/or software which may be stored in, for example, the memory 704. The MAD RM 804 may be configured by the MAD test configuration file 802 to generate a plurality of register settings and a plurality of pixel information that correspond to the tests and conditions specified in the MAD test configuration file 802. In this regard, the processor 702 in FIG. 7 may be utilized to perform at least a portion of the operations and/or functionality of the MAD RM 804.

The MAD RM 804 may comprise a MAD register setting interface, a network video bus input data interface, and a network video bus expected data interface through which the generated register settings and pixel information may be transferred to at least one of the register bus driver 814, the pixel information interface driver 812, and the verification monitor 806. In this regard, the MAD RM 804 may transfer register settings via the MAD register settings interface to the register bus driver 814. Register settings may refer to input register settings to be utilized by the MAD HM 810 during verification and/or expected register settings for comparison to simulated register settings generated by the MAD HM 810 during verification. The MAD RM 804 may also transfer input pixel information via the network video bus input data interface to the pixel information interface driver 812. Input pixel information may refer to a portion of the plurality of pixel information generated by the MAD RM 804 that may be utilized by the MAD HM 810. The MAD RM 804 may also transfer expected pixel information via the network video bus expected data interface to the verification monitor 806. Expected pixel information may refer to a portion of the plurality of pixel generated by the MAD RM 804 that may be utilized by the verification monitor 806 for comparison with simulated pixel information generated by the MAD HM 810.

The MAD HM 810 may comprise suitable logic, circuitry, and/or code that may be adapted to represent a hardware model of the specific MAD-3:2 102 design to be evaluated or verified. In this regard, the operations and/or functionality of the MAD HM 810 may be performed by the processor 702 when it is a code and/or software representation of the MAD-3:2 102 hardware design or may be performed by the emulator 706 in FIG. 7 when it is a hardware implementation of the MAD-3:2 102 hardware design. The MAD HM 810 may comprise a network video bus interface which may correspond to the network video input bus, the network video output bus, the input field stores, and the output field stores interfaces of the MAD-3:2 102 as shown in FIG. 3. The MAD HM 810 may also comprise an RBUS interface which may correspond to the RBUS interface to the FC 314 in FIG. 3. The register bus driver 814 may transfer register settings to the MAD HM 810 via the RBUS interface. The register settings may be input register settings and/or expected register settings. The pixel information interface driver 812 may transfer input pixel information to the MAD HM 810 via the network video bus interface. The MAD HM 810 may transfer simulated pixel data to the verification monitor 806 via the network video bus interface and/or may transfer simulated register settings to the register bus driver 814 via the RBUS interface.

The pixel information interface driver 812 may comprise suitable logic, circuitry, and/or code that may be adapted to receive input pixel information from the MAD RM 804 and transfer input pixel information to the MAD HM 810. The pixel information interface driver 812 may determine the order and/or timing in which the input pixel information may be transferred to the MAD HM 810. In this regard, the input pixel information may comprise current video field information, whether top field or bottom field, and/or field stores, and the pixel information interface driver 812 may generate an appropriate pixel constellation based on the current field video information and the field stores. The field stores may comprise prior video field information which may also include motion information. The register bus driver 814 may comprise suitable logic, circuitry, and/or code that may be adapted to receive input and expected register settings from the MAD RM 804, transfer input register settings to the MAD HM 810, and receive simulated register settings from the MAD HM 810. The register bus driver 814 may also be adapted to compare the expected register settings and the simulated register settings. The register bus driver 814 may also be adapted to determine and/or identify operational and/or functional discrepancies in the MAD-3:2 102 design based on the comparison between expected and simulated register settings. The register bus driver 814 may provide the input register settings to the MAD HM 810 in a manner that corresponds to the operation of the pixel information interface driver 812 when both the register bus driver 814 and the pixel information interface driver 812 are in operation.

The verification monitor 806 may comprise suitable logic, circuitry, and/or code that may be adapted receive expected pixel information from the MAD RM 804 and simulated pixel information from the MAD HM 810. In this regard, the expected pixel information and the simulated pixel information may comprise progressive video frames and/or field stores generated during the deinterlacing process. The verification monitor 806 may also be adapted to compare the expected pixel information and the simulated pixel information. The verification monitor 806 may also be adapted to determine and/or identify operational and/or functional discrepancies in the MAD-3:2 102 design based on the comparison between expected and simulated pixel information.

In operation, the configuration file 802 may be utilized to configure the MAD RM 804 in accordance with a verification mode. The verification mode may be a normal verification mode, a field controller verification mode, or a pixel processing verification mode. In the normal verification mode, the MAD RM 804 may be configured to generate the appropriate input values to the MAD HM 810 and the appropriate expected values for verifying the operation and/or functionality of the FC 314 and the PP 310 in FIG. 3. In the field controller verification mode, the MAD RM 804 may be configured to generate the appropriate input values to the MAD HM 810 and the appropriate expected values for verifying the operation and/or functionality of the FC 314. In the pixel processing verification mode, the MAD RM 804 may be configured to generate the appropriate input values to the MAD HM 810 and the appropriate expected values for verifying the operation and/or functionality of the PP 310. The MAD RM 804 may transfer the input values to the MAD HM 810 via the plurality of test-bench interface drivers 808. The simulated values generated by the MAD HM 810 may be verified by the verification monitor 806 and/or the register bus driver 814 in accordance with the verification mode selected. Since the MAD-3:2 102 in FIG. 1 operates on a field-by-field basis, the transfer of pixel information and/or register settings may also correspond to a field-by-field operation.

Figure 9:
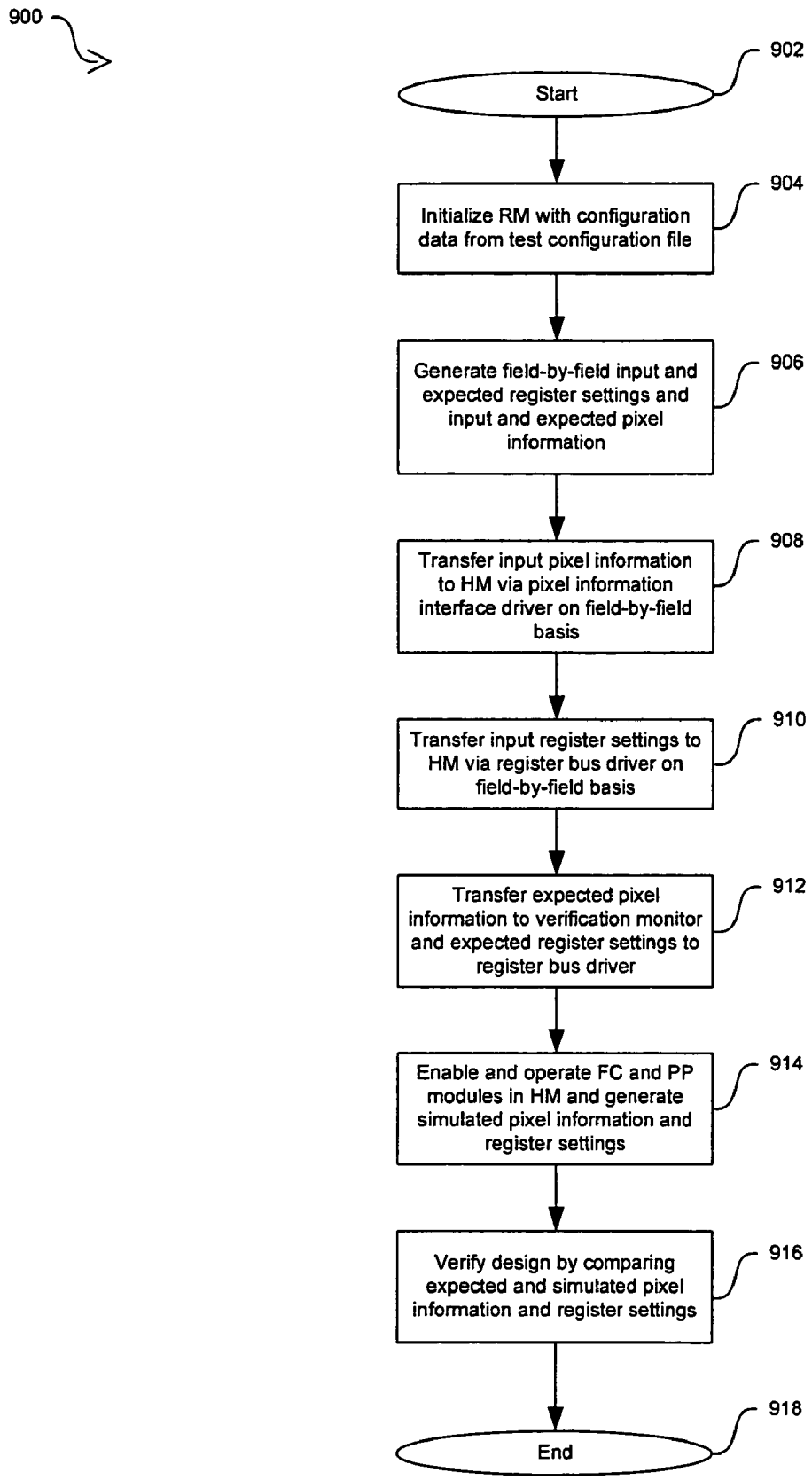
FIG. 9 is a flow diagram illustrating exemplary steps that may be utilized during a normal verification mode in a MAD design verification architecture, in accordance with an embodiment of the invention.

FIG. 9 is a flow diagram illustrating exemplary steps that may be utilized during a normal verification mode in a MAD design verification architecture, in accordance with an embodiment of the invention. Referring to FIG. 9, after start step 902, in step 904, the MAD RM 804 may be configured with the information provided by the MAD test configuration file 802 in accordance with a normal verification mode. In step 906, input pixel information, expected pixel information, input register settings, and expected register settings may be generated by MAD RM 804. In step 908, input pixel information may be transferred to the MAD HM 810, on a field-by-field basis, via the pixel information interface driver 812. In step 910, the input register settings may be transferred to the MAD HM 810 via the register bus driver 814. In step 912, the expected pixel information may be transferred to the verification monitor 806 and the expected register settings may be transferred to the register bus driver 814.

In step 914, the portion of the MAD HM 810 that corresponds to the FC 314 and the PP 310 of the MAD-3:2 102 in FIG. 1 may be enabled for operation. The MAD HM 810 may then generate a deinterlaced output based on the input pixel information and input register settings. In this regard, the FC 314 may first start operation by configuring the PP 310 sending the PP_conf signal and then sending the Field_start_probe signal to indicate the start of a new field. The PP 310 may then generate a deinterlaced output from the pixel constellation and the register settings provided by the current field control state registers 406 in FIG. 4. The deinterlaced output may be a portion of the simulated pixel information generated by the MAD HM 810. The PP 310 may also generate field stores which may be also be part of the simulated pixel information. The PP 310 may also generate statistical data which may be transferred to the FC 314 via the RBUS bus and which may be part of the simulated register settings since the statistical information, for example, Histogram, Frame_IT_diff, and Frame_unexpected_motion, may be accessed via the RBUS bus from registers in the IT control block 404 in FIG. 4. Moreover, signals generated by the IT control block 404 and/or the field state FIFO 402 may be access via the RBUS bus in the current field control state registers 406. Access for register information may be performed from outside the MAD HM 810 via the RBUS interface.

In step 916, the simulated register settings may be transferred to the register bus driver 814 for comparison with the expected register settings. Moreover, the simulated pixel information, which may include the deinterlaced output and field stores, may be transferred to the verification monitor for comparison with expected pixel information. The comparison of expected and simulated pixel information and/or that of expected and simulated register settings may provide information as to design flows and/or functional flaws with a particular MAD-3:2 102 hardware design. Once the verification is completed, the flow diagram 900 may proceed to end step 918.

Comparison of the information generated in a normal verification mode may take, for example, 15 minutes per field of 720×240 pixels. In this regard, a test video stream comprising 2000 video fields may take approximately 21 days for verification to be completed.

Figure 10:
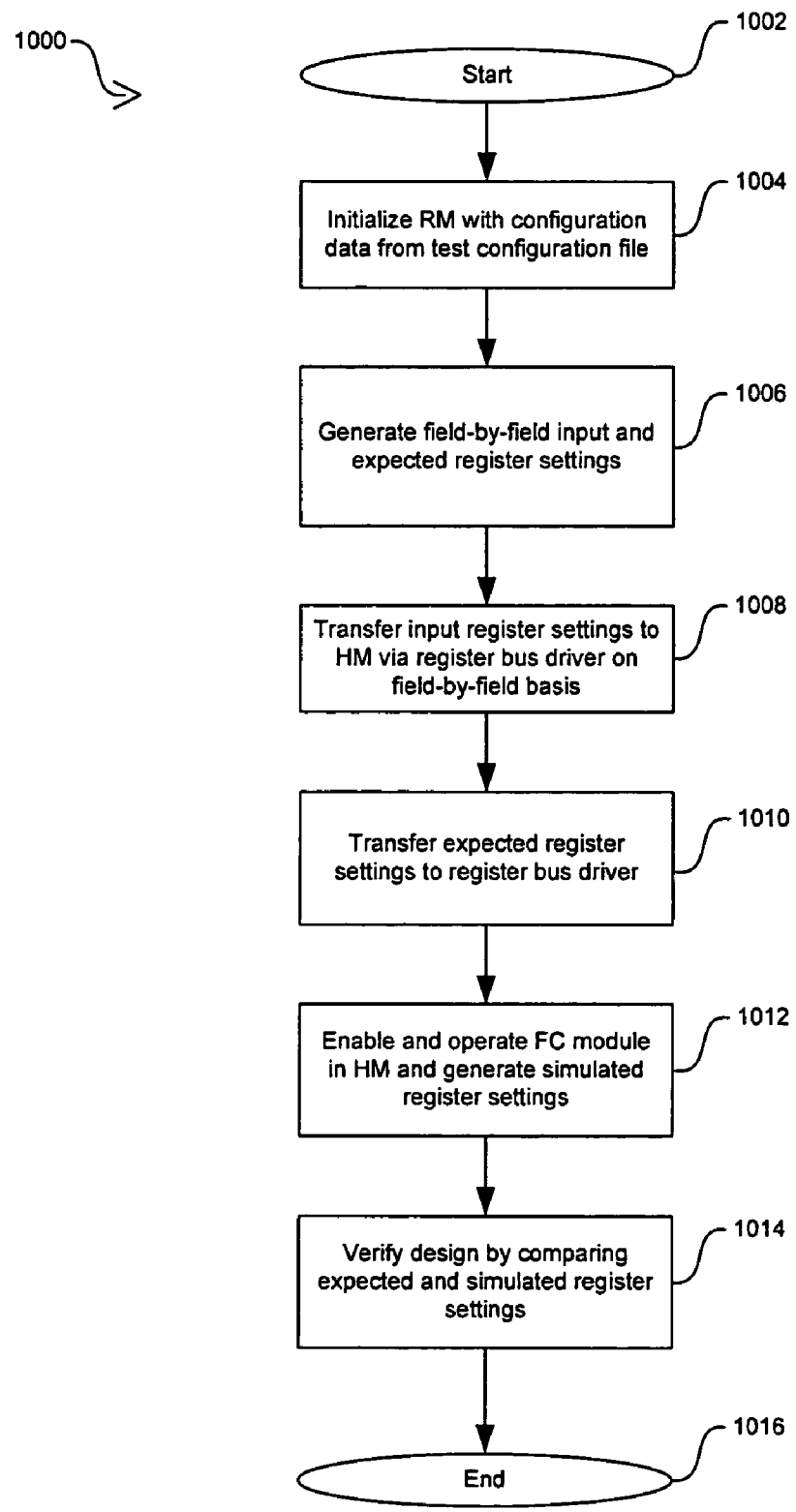
FIG. 10 is a flow diagram illustrating exemplary steps that may be utilized during a field controller verification mode in a MAD design verification architecture, in accordance with an embodiment of the invention.

FIG. 10 is a flow diagram illustrating exemplary steps that may be utilized during a field controller verification mode in a MAD design verification architecture, in accordance with an embodiment of the invention. Referring to FIG. 10, after start step 1002, in step 1004, the MAD RM 804 may be configured with the information provided by the MAD test configuration file 802 in accordance with a field controller verification mode. In step 1006, input register settings and expected register settings may be generated by MAD RM 804. In step 1008, the input register settings may be transferred to the MAD HM 810 via the register bus driver 814. In step 1010, the expected register settings may be transferred to the register bus driver 814.

In step 1012, the portion of the MAD HM 810 that correspond to the FC 314 of the MAD-3:2 102 in FIG. 1 may be enabled for operation. The MAD HM 810 may then generate simulated register settings based on input register settings on a field-by field basis. In this regard, the input register settings may correspond to register settings to the field state FIFO 402, the IT control block 404, and/or the current field control state registers 406. The input register settings may also correspond to statistical information that may have been transferred from the PP 310 had it been enabled. Moreover, signals generated by the IT control block 404 and/or the field state FIFO 402 may be access via the RBUS bus in the current field control state registers 406. Access for register information may be performed from outside the MAD HM 810 via the RBUS interface.

In step 1014, the simulated register settings may be transferred to the register bus driver 814 for comparison with the expected register settings. The comparison of expected and simulated register settings may provide information as to design flows and/or functional flaws with the FC 314 hardware design. Once the verification is completed, the flow diagram 1000 may proceed to end step 1016.

Comparison of a test video stream comprising 2000 video fields of 720×240 pixels may take approximately 10 minutes to complete in a field controller verification mode. In this regard, the field controller verification mode may provide a 3000× reduction in run time when verification is performed on the FC 314 only. This is a significant reduction when compared to the 21 days that would be required for a normal verification mode.

Figure 11:
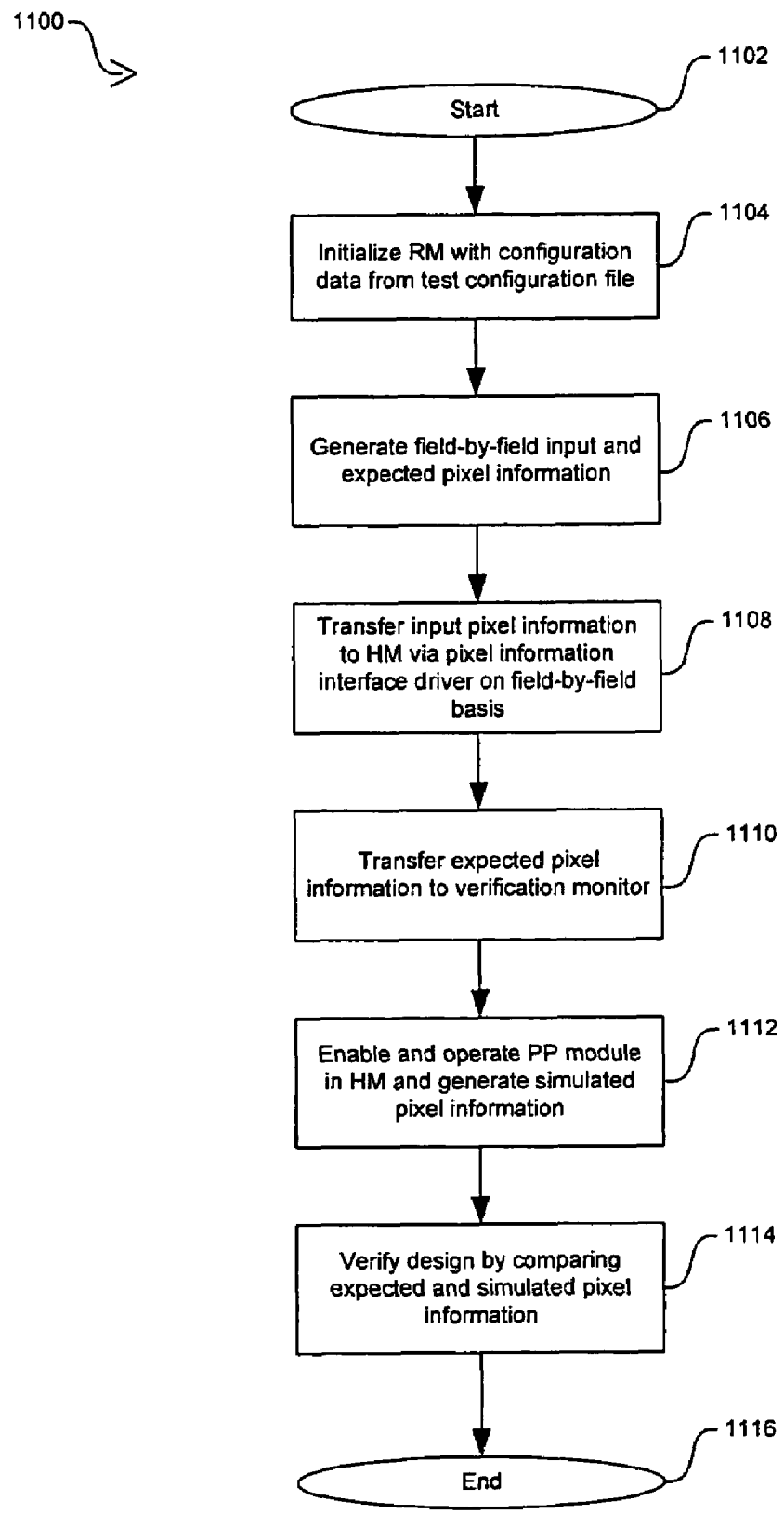
FIG. 11 is a flow diagram illustrating exemplary steps that may be utilized during a pixel processor verification mode in a MAD design verification architecture, in accordance with an embodiment of the invention.

FIG. 11 is a flow diagram illustrating exemplary steps that may be utilized during a pixel processor verification mode in a MAD design verification architecture, in accordance with an embodiment of the invention. Referring to FIG. 11, after start step 1102, in step 1104, the MAD RM 804 may be configured with the information provided by the MAD test configuration file 802 in accordance with a pixel processing verification mode. In step 1106, input pixel information and expected pixel information may be generated by MAD RM 804. In step 1108, the input pixel information may be transferred to the MAD HM 810 via the pixel information interface driver 812. In step 1110, the expected pixel information may be transferred to the verification monitor 806.

In step 1112, the portion of the MAD HM 810 that correspond to the PP 310 of the MAD-3:2 102 in FIG. 1 may be enabled for operation. The MAD HM 810 may then generate simulated pixel information based on the input pixel information and on internal register settings provided by the MAD HM 810. The input pixel information may be constructed in such a fashion as to test extreme conditions which may not generally arise in a conventional video stream. The PP 310 (FIG. 3) may generate corresponding luma and chroma values for all the pixels in a deinterlaced output. The PP 310 may also generate field stores that may be utilized in the deinterlacing of subsequent video fields. The simulated pixel information may comprise the deinterlaced output and/or the field stores.

In step 1114, the simulated pixel information may be transferred to the verification monitor 806 for comparison with the expected pixel information. The comparison of expected and simulated register pixel information may provide information as to design flows and/or functional flaws with the PP 310 hardware design. Once the verification is completed, the flow diagram 1000 may proceed to end step 1016.

The approach described herein may result in a more efficient verification of a deinterlacer system architecture by providing the ability to trace design flaws by isolating different portions of the design during verification. In this regard, efficiently finding and isolating design flaws may lead to either a more complete verification and/or a reduced verification time for the deinterlacer system.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for verifying a motion adaptive deinterlacer (MAD), the method comprising:
   in a processor:
   selecting a portion of a MAD hardware model for verification;
   generating a plurality of test parameters by a MAD reference model to verify said selected portion of said MAD hardware model;
   generating a plurality of simulation parameters in said selected portion of said MAD hardware model based on at least a portion of said generated plurality of test parameters; and
   comparing said generated plurality of simulation parameters with at least a portion of said generated plurality of test parameters for verification of said motion adaptive deinterlacer.

2. The method according to claim 1, further comprising selecting a verification mode for said MAD hardware model from a normal verification mode, a pixel processing verification mode, and a field controller verification mode.

3. The method according to claim 1 further comprising selecting a pixel processor and a field controller as said selected portion of said MAD hardware model when a normal verification mode is selected.

4. The method according to claim 1, further comprising selecting a pixel processor as said selected portion of said MAD hardware model when a pixel processing verification mode is selected.

5. The method according to claim 1, further comprising selecting a field controller as said selected portion of said MAD hardware model when a field controller verification mode is selected.

6. The method according to claim 1, further comprising transferring said at least a portion of said generated plurality of test parameters generated by said MAD reference model to a plurality of test-bench interface drivers.

7. The method according to claim 6, wherein said plurality of test-bench interface drivers comprise a pixel information interface driver and a register bus driver.

8. The method according to claim 7, further comprising transferring a plurality of input pixel information to said pixel information interface driver.

9. The method according to claim 7, further comprising transferring a plurality of input register settings and a plurality of expected register settings to said register bus driver.

10. The method according to claim 1, further comprising transferring a plurality of expected pixel information to a verification monitor.

11. The method according to claim 1, wherein said generated plurality of test parameters comprise a plurality of input pixel information, a plurality of expected pixel information, a plurality of input register settings, and a plurality of expected register settings when a normal verification mode is selected.

12. The method according to claim 1, wherein said generated plurality of test parameters comprise a plurality of input pixel information and a plurality of expected pixel information when a pixel processing verification mode is selected.

13. The method according to claim 1, wherein said generated plurality of test parameters comprise a plurality of input register settings and a plurality of expected register settings when a field controller verification mode is selected.

14. The method according to claim 1, further comprising comparing a plurality of simulated pixel information and a plurality of simulated register settings generated by said selected portion of said MAD hardware model with a plurality of expected pixel information and a plurality of expected register settings when a normal verification mode is selected.

15. The method according to claim 1, further comprising comparing a plurality of simulated pixel information generated by said selected portion of said MAD hardware model with a plurality of expected pixel information when a pixel processing verification mode is selected.

16. The method according to claim 1, further comprising comparing a plurality of simulated register settings generated by said selected portion of said MAD hardware model with a plurality of expected register settings when a field controller verification mode is selected.

17. A computer-readable medium having stored thereon, a computer program having at least one code section for verifying a motion adaptive deinterlacer (MAD), the at least one code section being executable by a machine for causing the machine to perform steps comprising:
   selecting a portion of a MAD hardware model for verification;
   generating a plurality of test parameters by a MAD reference model to verify said selected portion of said MAD hardware model;
   generating a plurality of simulation parameters in said selected portion of said MAD hardware model based on at least a portion of said generated plurality of test parameters; and comparing said generated plurality of simulation parameters with at least a portion of said generated plurality of test parameters for verification of said motion adaptive deinterlacer.

18. The computer-readable medium according to claim 17, wherein said at least one code section comprises code for selecting a verification mode for said MAD hardware model from a normal verification mode, a pixel processing verification mode, and a field controller verification mode.

19. The computer-readable medium according to claim 17, wherein said at least one code section comprises code for selecting a pixel processor and a field controller as said selected portion of said MAD hardware model when a normal verification mode is selected.

20. The computer-readable medium according to claim 17, wherein said at least one code section comprises code for selecting a pixel processor as said selected portion of said MAD hardware model when a pixel processing verification mode is selected.

21. The computer-readable medium according to claim 17, wherein said at least one code section comprises code for selecting a field controller as said selected portion of said MAD hardware model when a field controller verification mode is selected.

22. The computer-readable medium according to claim 17, wherein said at least one code section comprises code for transferring said at least a portion of said generated plurality of test parameters generated by said MAD reference model to a plurality of test-bench inter-face drivers.

23. The computer-readable medium according to claim 22, wherein said plurality of test-bench interface drivers comprise a pixel information interface driver and a register bus driver.

24. The computer-readable medium according to claim 23, wherein said at least one code section comprises code for transferring a plurality of input pixel information to said pixel information interface driver.

25. The computer-readable medium according to claim 23, wherein said at least one code section comprises code for transferring a plurality of input register settings and a plurality of expected register settings to said register bus driver.

26. The computer-readable medium according to claim 17, wherein said at least one code section comprises code for transferring a plurality of expected pixel information to a verification monitor.

27. The computer-readable medium according to claim 17, wherein said generated plurality of test parameters comprise a plurality of input pixel information, a plurality of expected pixel information, a plurality of input register settings, and a plurality of expected register settings when a normal verification mode is selected.

28. The computer-readable medium according to claim 17, wherein said generated plurality of test parameters comprise a plurality of input pixel information and a plurality of expected pixel information when a pixel processing verification mode is selected.

29. The computer-readable medium according to claim 17, wherein said generated plurality of test parameters comprise a plurality of input register settings and a plurality of expected register settings when a field controller verification mode is selected.

30. The computer-readable medium according to claim 17, wherein said at least one code section comprises code for comparing a plurality of simulated pixel information and a plurality of simulated register settings generated by said selected portion of said MAD hardware model with a plurality of expected pixel information and a plurality of expected register settings when a normal verification mode is selected.

31. The computer-readable medium according to claim 17, wherein said at least one code section comprises code for comparing a plurality of simulated pixel information generated by said selected portion of said MAD hardware model with a plurality of expected pixel information when a pixel processing verification mode is selected.

32. The computer-readable medium according to claim 17, wherein said at least one code section comprises code for comparing a plurality of simulated register settings generated by said selected portion of said MAD hardware model with a plurality of expected register settings when a field controller verification mode is selected.

33. A system for verifying a motion adaptive deinterlacer (MAD), the system comprising:
at least one processor that selects a portion of a MAD hardware model for verification;
said at least one processor generates a plurality of test parameters to verify said selected portion of said MAD hardware model;
said selected portion of said MAD hardware model generates a plurality of simulation parameters based on at least a portion of said generated plurality of test parameters; and
said at least one processor compares said generated plurality of simulation parameters with at least a portion of said generated plurality of test parameters for verification of said motion adaptive deinterlacer.

34. The system according to claim 33, wherein at least one memory stores a configuration file for generating said plurality of test parameters.

35. The system according to claim 33, wherein said at least one processor selects a verification mode for said MAD hardware model from a normal verification mode, a pixel processing verification mode, and a field controller verification mode.

36. The system according to claim 33, wherein said at least one processor selects a pixel processor and a field controller as said selected portion of said MAD hardware model when a normal verification mode is selected.

37. The system according to claim 33, wherein said at least one processor selects a pixel processor as said selected portion of said MAD hardware model when a pixel processing verification mode is selected.

38. The system according to claim 33, wherein said at least one processor selects a field controller as said selected portion of said MAD hardware model when a field controller verification mode is selected.

39. The system according to claim 33, wherein said at least one processor compares a plurality of simulated pixel information and a plurality of simulated register settings generated by said selected portion of said MAD hardware model with a plurality of expected pixel information and a plurality of expected register settings when a normal verification mode is selected.

40. The system according to claim 33, wherein said at least one processor compares a plurality of simulated pixel information generated by said selected portion of said MAD hardware model with a plurality of expected pixel information when a pixel processing verification mode is selected.

41. The system according to claim 33, wherein said at least one processor compares a plurality of simulated register settings generated by said selected portion of said MAD hardware model with a plurality of expected register settings when a field controller verification mode is selected.

42. A method for verifying a motion adaptive deinterlacer (MAD), the method comprising:
- in a processor, selecting either one of a pixel processor and a field controller for separate verification, wherein said motion adaptive deinterlacer comprises said pixel processor and said field controller; and
- in said processor, simulating said selected one of said pixel processor and said field controller to verify design and/or operation of said selected one of said pixel processor and said field controller.

43. The method according to claim 42, further comprising selecting said pixel processor when a pixel processing verification mode is selected.

44. The method according to claim 43, further comprising generating a plurality of input pixel information and a plurality of expected pixel information when said pixel processing verification mode is selected.

45. The method according to claim 44, further comprising comparing a plurality of simulated pixel information with said plurality of expected pixel information when said pixel processing verification mode is selected.

46. The method according to claim 42, further comprising selecting said field controller when a field controller verification mode is selected.

47. The method according to claim 46, further comprising generating a plurality of input register settings and a plurality of expected register settings when said field controller verification mode is selected.

48. The method according to claim 47, further comprising comparing a plurality of simulated register settings with said plurality of expected register settings when said field controller verification mode is selected.

* * * * *

UNITED STATES PATENT AND TRADEMARK OFFICE
CERTIFICATE OF CORRECTION

PATENT NO. : 7,630,870 B2 Page 1 of 1
APPLICATION NO. : 11/005092
DATED : December 8, 2009
INVENTOR(S) : Chen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1097 days.

Signed and Sealed this

Second Day of November, 2010

David J. Kappos
*Director of the United States Patent and Trademark Office*